Feb. 28, 1939.  C. D. McCALL  2,149,122

SHAFT MOUNTING

Filed Dec. 30, 1935

INVENTOR:
CHARLES D. McCALL,
BY Gales P. Moore
HIS ATTORNEY.

Patented Feb. 28, 1939

2,149,122

UNITED STATES PATENT OFFICE 2,149,122

SHAFT MOUNTING

Charles D. McCall, Birmingham, Mich., assignor to General Motors Corporation, Detroit, Mich., a corporation of Delaware Application December 30, 1935, Serial No. 56,639

3 Claims. (Cl. 308—184)

This invention relates to shaft mountings and comprises all of the features of novelty herein disclosed. An object of the invention is to provide an improved means and method for assembling and supporting a rotating shaft such as the propeller shaft of a motor vehicle, especially when the shaft is long and made in sections. Another object is to provide a bearing mounting for propeller shafts and the like which will compensate for angularity in the shaft and for manufacturing variations in chassis assembly or weaving of the chassis in use. Another object is to provide a cushioned bearing mounting for propeller shafts and the like to compensate for misalignment and dampen vibration. Still another object is to provide a simple, reliable and inexpensive compensating support for the propeller shaft of a motor vehicle.

To these ends and also to improve generally upon devices of this character the invention consists in the various matters hereinafter described and claimed. In its boader aspects, the invention is not necessarily limited to the specific constructions selected for illustrative purposes in the accompanying drawing in which Fig. 1 is an axial section of a propeller shaft mounting.

Figure 1:
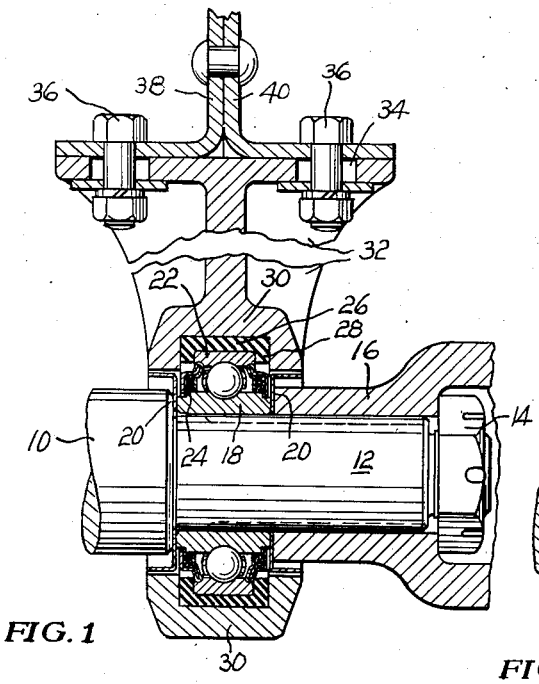

In Fig. 1, the numeral 10 indicates a propeller shaft section having a splined portion 12 which is secured by a nut 14 to a coupling member 16 for another shaft section (not shown). An inner race ring 18 of the antifriction bearing and angled washers or shields 20 are clamped between a shoulder on the shaft and the coupling member 16. The bearing has rolling elements herein shown as balls running in an outer race ring 22, the ends of the bearing having suitable seals 24 to retain lubricant. Disposed around the bearing and embracing the outer race ring 22 is a cushioning ring 26 of rubber or the like, the rubber ring having side flanges 28 engaging the ends of the race ring. The cushion is thus channel-shaped in cross section and is enclosed in a flanged housing 30 which is conveniently split for assembly. The housing is part of a hanger bracket 32 provided with slots 34 for bolts 36 which clamp the bracket to a cross member of the frame, such cross member herein being indicated as a channel iron 38 to which an angle iron 40 is riveted. Thus the shaft has an additional support between the transmission and the rear axle. When the propeller shaft is being assembled with the chassis, the bolts are loose thus allowing the housing 30 and the bearing to shift axially and select their own proper positions to compensate for manufacturing variations. The bolts are then tightened without there being any initial thrust load on the bearing or on the rubber side flanges 28 as would occur upon unequal compression of said flanges. The rubber will give to take care of any misalignment or weaving and will absorb vibration due to shaft whip.

Figure 2:
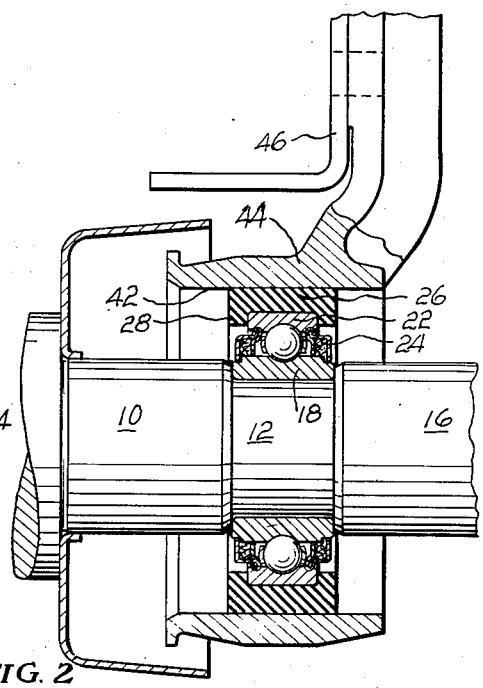
Fig. 2 is a similar view of a modification.

In Fig. 2, the cushioning ring 26 is mounted in a round bore 42 of a housing or bracket 44 which is bolted to a cross member 46 without adjustment. During assembly, the cushioning ring is soaked with hydraulic brake fluid allowing the ring to slip endwise in its housing to select its own position and compensate for accumulative manufacturing variations. When the fluid drys, it acts to cement the cushioning ring in its self-adjusted position. The rubber will give to compensate for misalignment or weaving and will absorb vibration.

Figure 3:
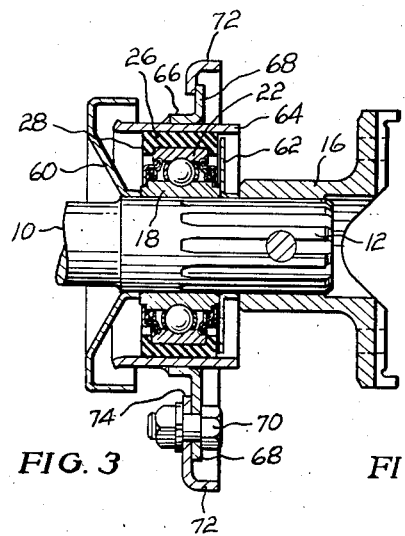
Fig. 3 is a similar view of another modification.
Figure 4:
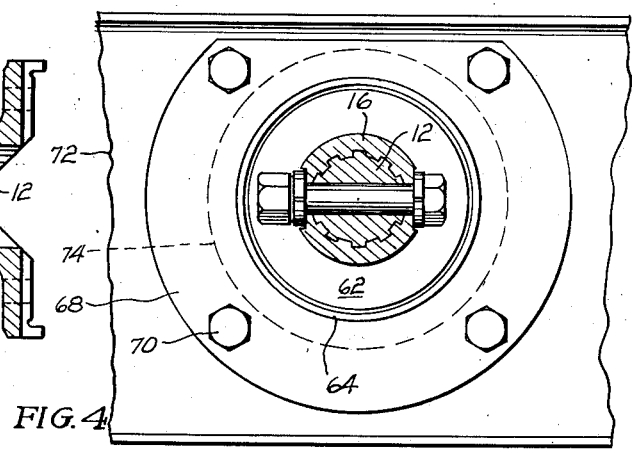
Fig. 4 is a side view of parts shown in Fig. 3.

In Fig. 3, the inner race ring 18 of the bearing lies between a shield 60 and a slinger 62. The outer race ring 22 is embraced by a cushioning ring 26 which fits in a sleeve or housing 64 which is welded to a lateral flange 66 of a ring or bracket 68. The ring or bracket 68 is secured by bolts 70 to a frame cross bar 72, the lateral flange 66 and the sleeve 64 projecting through a hole 74 in the cross bar. The cushioning ring is allowed to find its own location axially as in Fig. 2.

I claim:

1. In a device of the character described, a propeller shaft, a frame member extending crosswise of the shaft, a supporting member secured to the frame member and having an opening substantially concentric with the shaft, an antifriction bearing and a cushioning ring arranged one within the other between the shaft and the opening, the bearing being adapted to take radial load and thrust load in two directions, the cushioning ring having side flanges embracing opposite ends of one of the bearing race rings and being shiftable therewith to a self-selected axial position, and means for causing the cushioning ring to be secured against axial movement when said self-selected axial position has been taken to thereby avoid unequal stress on the cushioning side flanges and consequent initial thrust load on the bearing; substantially as described.

2. In a device of the character described, a propeller shaft, a frame member extending crosswise of the shaft, a bracket hanging from the frame member and having a circular channel substantially concentric with the propeller shaft, a cushioning ring of channel section fitting in the channel and shiftable with the bracket to a self-selected axial position, an antifriction bearing between the cushioning ring and the shaft and adapted to take radial load and thrust load in two directions, the inner race ring of the bearing being secured to the shaft and the outer race ring being confined peripherally and axially by the cushioning ring, and means for causing the bracket and the cushioning ring to be secured against axial movement after said self-selected position has been taken to thereby avoid initial thrust load on the cushioning ring and the bearing; substantially as described.

3. In a device of the character described, a propeller shaft, a frame member extending crosswise of the shaft, a supporting member secured to the frame member and having a circular channel substantially concentric with the propeller shaft, a cushioning ring fitting in the channel and shiftable with the supporting member to a self-selected axial position, an antifriction bearing between the cushioning ring and the shaft and adapted to take radial load and thrust load in two directions, the inner race ring of the bearing being secured to the shaft and the outer race ring having its periphery fitting in the cushioning ring, the cushioning ring having side flanges embracing opposite ends of the outer race ring to cushion said race ring axially, and means for causing the supporting members and the cushioning ring to be secured against axial movement after said self-selected axial position has been taken to thereby avoid unequal compression of the side flanges and consequent initial thrust load on the bearing; substantially as described.

CHARLES D. McCALL.